United States Patent [19]

Wellach

[11] Patent Number: 4,740,116
[45] Date of Patent: Apr. 26, 1988

[54] HOLDING DEVICE FOR A REAMER

[76] Inventor: Adolf Wellach, Fahrenberg 12a, D-4300 Essen 15, Fed. Rep. of Germany

[21] Appl. No.: 752,910

[22] Filed: Jul. 8, 1985

[30] Foreign Application Priority Data

Jul. 13, 1984 [DE] Fed. Rep. of Germany ....... 3425869
Nov. 22, 1984 [DE] Fed. Rep. of Germany ... 8434179[U]

[51] Int. Cl.⁴ ....................... B23B 51/06; B23Q 11/10
[52] U.S. Cl. ..................................... 408/59; 10/89 F;
29/DIG. 92; 279/16; 279/20; 408/127
[58] Field of Search ....................... 279/16, 20, 30, 75,
279/1 Q; 10/89 F, 141 H; 408/57, 239, 59, 127;
29/DIG. 68, DIG. 92; 409/136

[56] References Cited

U.S. PATENT DOCUMENTS

| 1,359,103 | 11/1920 | Randa | 279/16 |
| 1,376,791 | 5/1921 | Baker et al. | 279/16 X |
| 2,042,648 | 6/1936 | Ziegler | 279/16 |
| 3,072,417 | 1/1963 | Ziegler | 279/16 |
| 3,077,352 | 2/1963 | Van Straaten | 279/16 |
| 4,082,472 | 4/1978 | Mossner et al. | 408/57 |
| 4,552,495 | 11/1985 | Malzkorn | 408/57 |

Primary Examiner—Z. R. Bilinsky
Attorney, Agent, or Firm—Collard, Roe & Galgano

[57] ABSTRACT

The invention provides a holding device for a reamer tool in a machine tool, which comprises a tool holder adapted to be secured to the machine tool for rotation about a longitudinal axis, a tool receiving bushing radially displaceably guided in the tool holder, and a coupling providing a non-rotational connection between the tool holder and the tool receiving bushing. The coupling comprises a coupling disc having two radial end faces, a first one of the coupling disc end faces cooperating with a radical end face of the tool holder, a second one of the coupling disc end faces cooperating with a radial end face of the tool receiving bushing, at least a part of the coupling disc end faces and of the tool holder and tool receiving bushing end faces being configurated as planar gliding surfaces, and pairs of the gliding surfaces facing and contacting each other for transmitting axial pushing forces to the reamer tool. The holding device includes a cooling liquid delivery system to the reamer tool, which consists of respective central bores in the tool holder and bushing, a tubular, liquid-impermeable hose connecting the bores, the hose having opposite ends respectively connected to the tool holder and to the bushing, bridging the coupling and being deformable in response to any relative movement between the tool holder and bushing during a reaming operation, and liquid-tight seals between the walls of the bore and the tubular structural part.

17 Claims, 4 Drawing Sheets

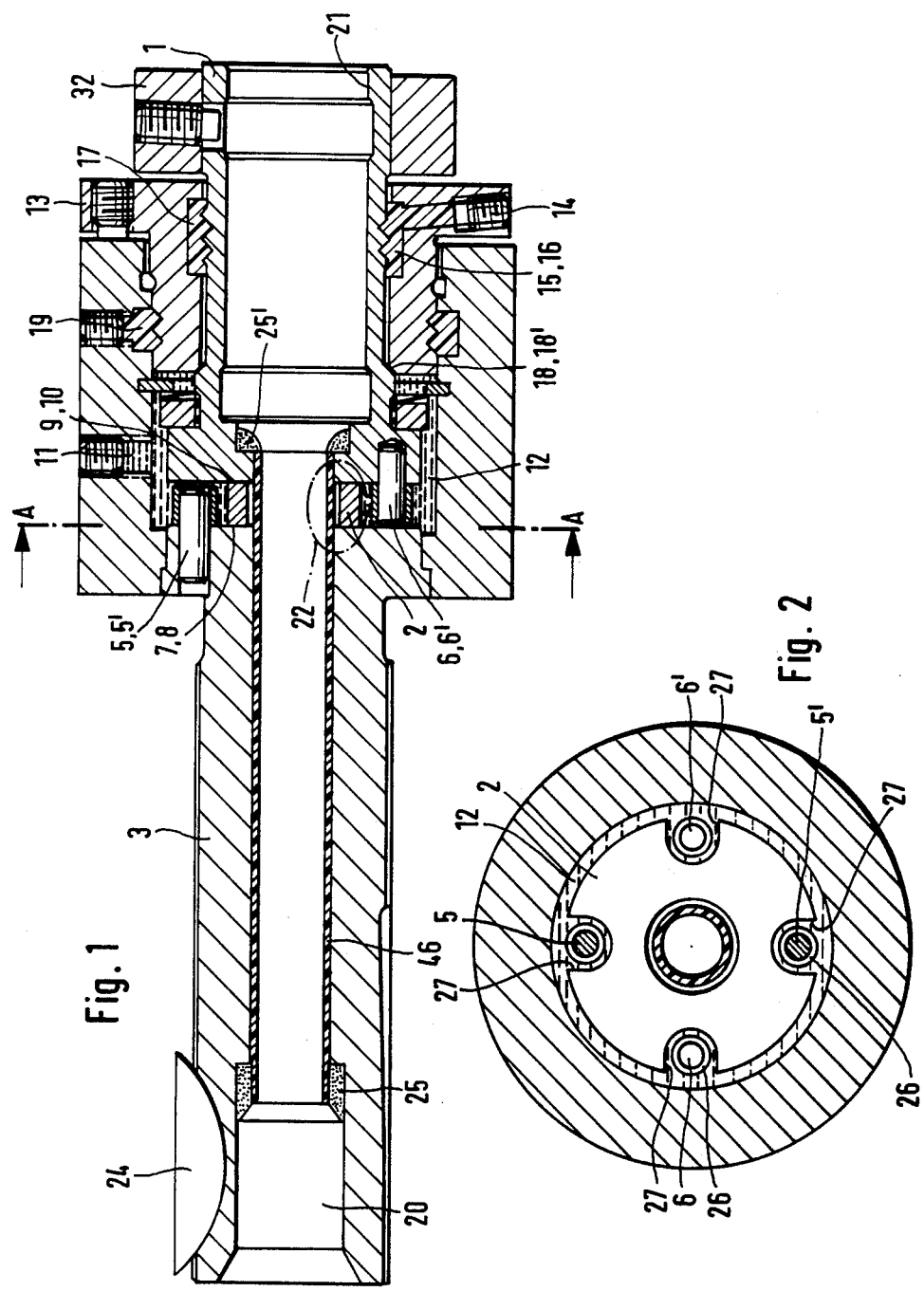

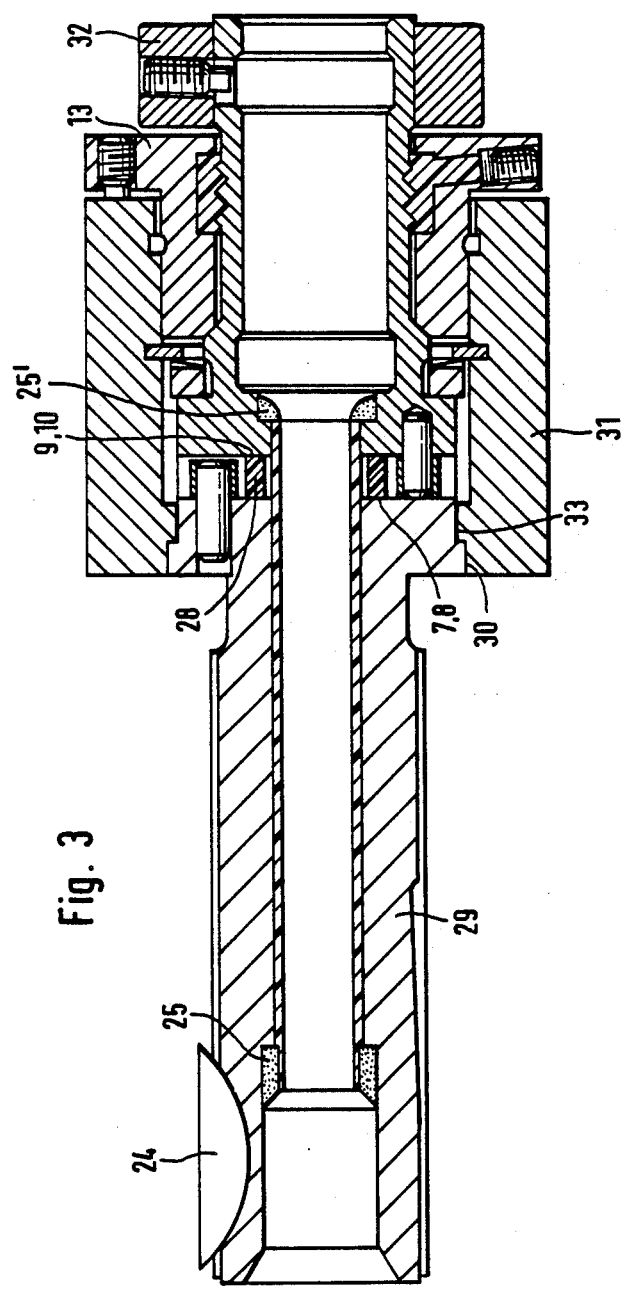

HOLDING DEVICE FOR A REAMER

FIELD OF THE INVENTION

The present invention relates generally to tool holding devices and particularly to a holding device for a reamer tool in a machine tool of the kind wherein a tool receiving means, such as a bushing, is radially displaceably guided in a tool holder affixed to the machine tool and a suitable coupling means, such as an Oldham coupling, provides a non-rotary connection between the tool holder and receiving means.

BACKGROUND OF THE INVENTION

Reamer holders of this type have been used to eliminate any axial offset between a fixed reamer receiving bushing and a bore to be reamed in the operation of reamers on machine tools. The tool receiving bushing must be very easy to displace radially so that the reamer follows the axial offset even when subjected to high axial pushing forces and an accurate bore is reamed. For this purpose, German patent No. 1,256,039 proposes to provide the Oldham coupling disc with axial holes in which balls are inserted. The diameter of the balls is larger than the thickness of the coupling disc so that the balls roll between radial faces of the tool receiving bushing and the holder affixed to the machine tool. Therefore, the axial pushing forces for the reamer are transmitted by these balls which also make the radial displacement possible. Due to the presently prevailing high pushing speeds and the resultant high axial pressures used in machine tools of this type, the balls rapidly are pressed into the radial bearing faces. This makes the radial displacement of the tool receiving bushing more difficult, with the result that the reamer is eccentrically guided and the reamed bore does not have the required precision. This tendency towards sluggish mobility is further enhanced because the cooling water transports reamed chips into the range of the coupling. The chips are rolled by the balls, fixed and cause permanent deterioration of the quality of the bearing faces.

SUMMARY OF THE INVENTION

It is the primary object of this invention to improve a holding device for a reamer tool so that its service life is substantially increased and any axial offset between the reamer tool and the bore to be reamed may be readily compensated over a long period of time.

The invention does not provide for an axial angular mobility of the tool receiving bushing. It provides that at least a portion of both radial end faces of the coupling disc, of a radial end face of the holder and of an end face of the tool receiving bushing are configured as planar gliding surfaces, and that these gliding surfaces face, and are in engaging contact with, each other for transmitting the axial pushing forces to the reamer tool. This produces a substantial reduction in the pressure between facing surfaces as compared to conventional structures, which substantially increases the service life of the reamer holding device, i.e. the time during which a reamer tool may operate without excessive wear. This means not only a more precise operating result without continuous controls but also a reduction of operating expenses since the expensive reamer holding devices need not be replaced so frequently. The gliding surfaces need not be ground and made of very hard steel, which decreases the cost of manufacturing the reamer holding device. The use of a reamer holding device according to the invention is of particular advantage in mass production operations, such as in the manufacture of cars, since they involve the use of primarily relatively new machine tools and, therefore, require no axial angular mobility of the reamer.

According to a preferred feature, the radial end faces of the coupling disc and the entire surface of the radial end faces of the tool holder and of the tool receiving bushing are constituted as planar gliding surfaces extending Perpendicularly to the axis of rotation of the tool receiving bushing.

To obtain the lowest possible pressure on the surfaces, the two facing gliding surfaces should be at least approximately of the same size and shape. In this way, the wear is distributed over relatively large pairs of surfaces so that the service life is further increased.

According to one embodiment of this invention, a lubricating or anti-friction medium, such as oil, may be placed between the gliding surfaces or at least one surface of a pair of gliding surfaces may be coated with a synthetic resin of high gliding ability (low friction). It is, however, also possible to make the coupling disc itself of a plastic material of high gliding ability (low friction).

Machine tools in which a cooling liquid flows through bores which are concentric to the tool receiving bushing and to the tool holder are subject to the deposition of chips in the range of the coupling since the cooling liquid may transport fine chips thereto. According to a preferred feature of the present invention, this is prevented by providing a tubular, liquid-impermeable structural part bridging at least that area where the tool holder and tool receiving means connected by the coupling disc face each other, the structural part consisting of a material deformable upon relative movement between the tool holder and the tool receiving means. This structural part is fixedly attached at its respective ends with the tool receiving means and the holder. The relative movement between the tool holder and the tool receiving means is compensated by the relatively long tubular structural part which may be flexed along its entire length during operation and functions flawlessly to conduct the cooling liquid. Fixed connections which, because of the deformation of the tubular structural part, are not subject to any transverse mechanical loads serve to provide an absolutely sealed connection between the ends of the tubular structural part and the cooling liquid conducting bores in the tool holder and the tool receiving means. Preferably, the tubular, deformable structural part is a plastic or metallic flexible hose adapted to withstand the pressure of the cooling liquid.

One of the essential requirements for a reamer holding device, which also affects its service life, is the precise alignment between the tool holder affixed to the machine and the tool receiving means. This requirement may be met according to another embodiment of the invention with a coupling disc having gliding surfaces cooperating with corresponding gliding surfaces of the tool holder and of the tool receiving means if the tool holder comprises an insert element for insertion into the machine tool and having a radial end gliding face defining an outer limit surface and a sleeve encompassing the range of the coupling and a portion of the tool receiving means, the insert element and the sleeve having respective ends dimensioned for connection to each other after their preparation. The insert element and the sleeve are simple turned pieces. More particularly, it is easy to make the longitudinal axis of the insert element exactly perpendicular to the gliding surface even if the gliding surface is to be ground.

According to another preferred feature of this invention, the insert element and the sleeve have interengaging and complementary centering parts and walls defining a chamber which serves as a receptacle for a bonding medium for connecting the insert element and the sleeve.

The reamer holding device is assembled by placing the coupling disc on the end gliding face of the vertically standing insert element and placing the gliding face of the tool receiving means on the coupling disc after it has been assembled with the other parts of the reamer holding device. The gliding surfaces are aligned in full contact with each other under the weight of the individual parts. A bonding medium introduced into the chamber connects the insert element and the sleeve, thus producing an accurately aligned holding device.

BRIEF DESCRIPTION OF THE DRAWING

The above and other objects, advantages and features of the present invention will become more apparent from the following detailed description of certain now preferred embodiments thereof, taken in conjunction with the accompanying drawing wherein FIG. 1 shows an axial section of a reamer holding device;

FIG. 2 illustrates the Oldham coupling in a section along line A—A of FIG. 1;

FIG. 3 shows an axial section of a reamer holding device with a coupling disc of high gliding ability;

DETAILED DESCRIPTION OF THE PREFERRED EMBODIMENTS

Figure 4:
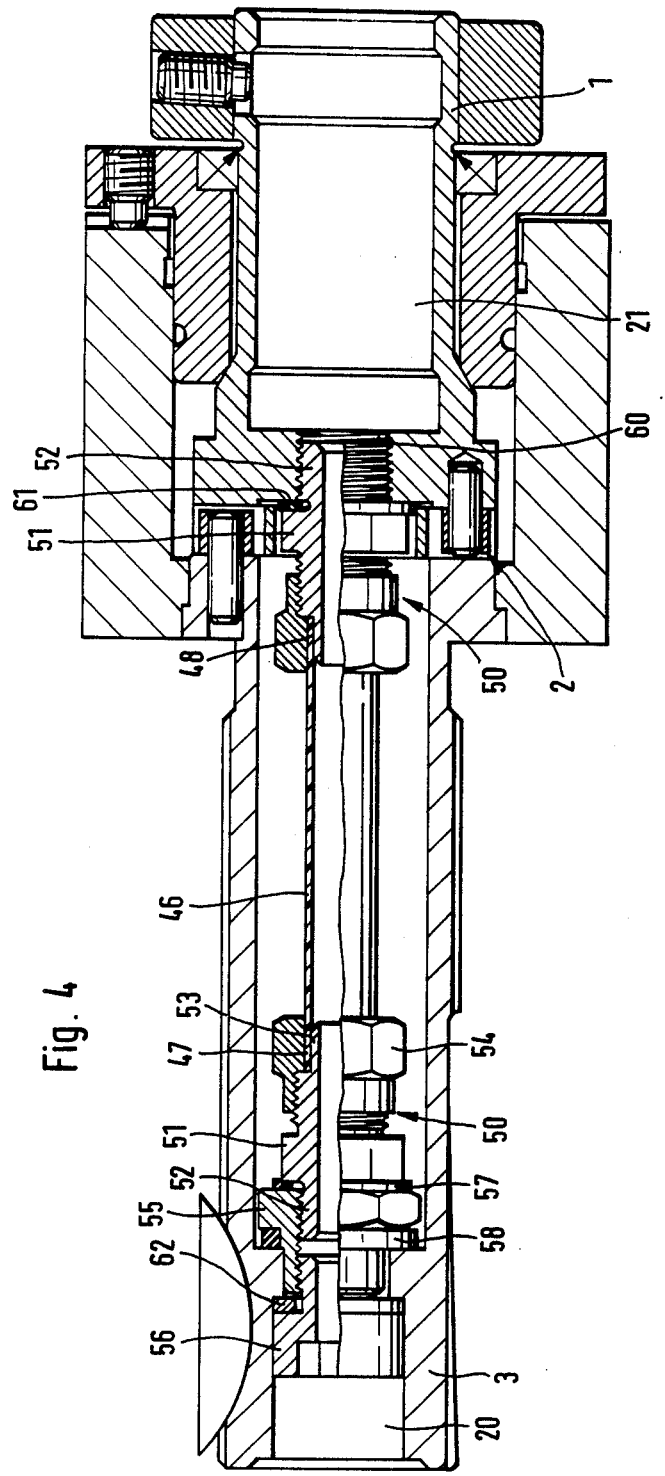
FIG. 4 shows an enlarged axial section of a reamer holding device, with a detailed illustration of the sealing of the coupling.

Referring now to the drawing and first to FIG. 1, there is shown tool receiving means constituted by bushing 1 connected by Oldham coupling disc 2 to tool holder 3. Two bolts or pins 5, 5' and 6, 6' respectively attached to holder 3 and bushing 1 engage coupling disc 2. Gliding face 7 of coupling disc 2 contacts gliding face 8 of holder 3 and gliding face 9 of the coupling disc contacts gliding face 10 of tool receiving bushing 1. To assure sufficient lubrication of the pairs of gliding faces 7, 8 and 9, 10, oil chamber 11 supplies oil 12 to provide a lubricating film between the pairs of gliding faces. Threaded ring 13 is screwed to holder 3, the inner diameter of the ring being larger than the outer diameter of tool receiving bushing 1 by the amount of the maximal radial mobility of the axis of the bushing. To seal the resultant gap, silicone mass 17, which hardens in situ, is introduced through aperture 14 in facing recesses 15 and 16 of bushing 1 and threaded ring 13 The same type of seal 19 is provided between holder 3 and threaded ring 13.

Threaded ring 13 has beveled end 18 cooperating with complementary beveled shoulder 18' of bushing 1. If threaded ring 13 has been screwed in so that beveled end 18 is in contact with beveled shoulder 18', the radial displaceability of the tool receiving bushing is reduced to zero. This radial displaceability may be adjusted in accordance with the distance between beveled end 18 and beveled shoulder 18', i.e. how far the ring is screwed into the holder.

In the illustrated reamer holding device, a cooling liquid may be supplied through bore 20 in holder 3 and bore 21 in tool receiving bushing 1. A liquid-impermeable hose 46 is bonded at its ends 25 and 25' to holder 3 and bushing 1, respectively, to prevent the cooling liquid from coming into contact with the gliding faces in the area designated 22. This arrangement and the previously described seals 17 and 19 protect the gliding faces from the cooling liquid and any chips carried thereby.

Wedge 24 holds holder 3 in the machine tool against rotation. The non-illustrated reamer tool is connected to tool receiving bushing 1 by fastening means 32.

The section of FIG. 2 shows coupling disc 2 in top view. Bolts or pins 5, 5' and 6, 6' are offset from each other by 90° and carry sleeves 26 which readily roll in slots 27 of the coupling disc.

To avoid redundancy in the description, like parts functioning in a like manner are designated by the same reference numerals in FIG. 3. No oil lubrication is provided in this embodiment. Instead, proper gliding of the 2 of a synthetic resin material of high gliding ability, i.e. low friction. In all other respects, the structure is the same as that of FIG. 1. This also applies to the division of holder 3 into two parts. Insert element 29 of the tool holder is adapted to be inserted into the machine tool and is aligned with tool holder sleeve 31 by centering parts 30, 30'. The fit of the centering parts in area 32 is such that a sufficiently thick adhesive film may penetrate therethrough to bond insert element 29 to sleeve 31. Preferably, a two-component bonding agent which hardens in a few hours is used for this purpose. Making holder 3 in two parts simplifies its manufacture and makes it universally useful because the same holder insert element 29 may be used for holding devices for reamer tools of different diameters.

In the embodiment of FIG. 4, synthetic resin hose 46 is used to conduct the reamer cooling liquid from bore 20 to bore 21. Ends 47 and 48 of hose 46 are respectively connected to holder 3 and tool receiving bushing 1 by fittings 50. Each fitting comprises coupling piece 51 defining a central bore and having threaded connection 52 and nozzle 53, and nut 54 which may be screwed to the coupling piece. Hose ends 47 and 48 are slidably mounted on nozzles 53 and clamped into liquid-tight engagement therewith by nuts 54.

Tool receiving bushing 1 has inner thread 60 threadedly engaged by threaded connection 52 of adjacent coupling piece 51. Sealing ring 61 is placed between a radial annular shoulder of coupling piece 51 and an annular end face of bushing 1 to seal the fitting with all cooling liquid carrying passages from bushing 1. Hose fitting 50 is indirectly connected to holder 3 by interiorly threaded connecting ring 55 and clamping screw 56. Connecting ring 55 has a flange whose annular end face faces a radial annular shoulder of coupling piece 51, sealing ring 57 being placed between the annular end face and shoulder to provide a liquid-tight seal. Clamping screw 56 is screwed into the part of connecting ring 55 which projects beyond connection 52 and is supported on radial annular shoulder 62, a washer and a sealing ring being placed therebetween. Further sealing ring 58 is placed between the radial face of the flange of connecting ring 55, which faces away from coupling piece 51 and a radial face of holder 3 adjacent thereto. When clamping screw 56 is tightened, fitting 50 is displaced to the left, as seen in FIG. 4, sealing rings 57 and 58 providing a liquid-tight seal between holder 3 and bore 20 and the interior of hose 46.

Figure 5:
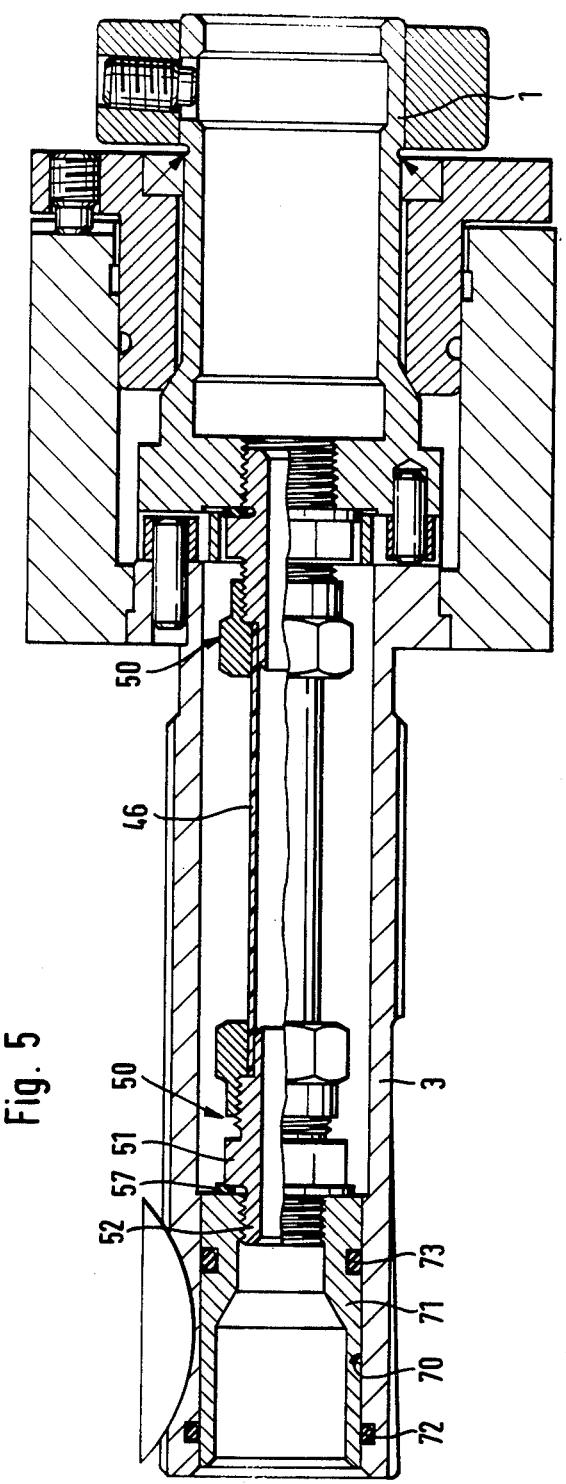
FIG. 5 shows a like section illustrating another embodiment of affixing the sealing device.

FIG. 5 illustrates an embodiment which permits a particularly simple assembly. Threaded connection 52 of coupling piece 51 is screwed to connecting piece 71, with the interposition of sealing ring 57 to assure a liquid-tight seal. 0-rings 72, 73 establish a seal between connecting piece 71 and the wall of bore 70 of holder 3. The assembly of connecting piece 71 with the holder is efffected simply by sliding the connecting piece into the holder, together with the previously screwed-in coupling piece 51, hose 46 and tool receiving bushing 1 previously attached to the opposite end of the hose.

To compensate for the radial relative movement between holder 3 and bushing 1, hose 46 is relatively long. Therefore, there is no interference with the automatic centering of the reamer during the reaming operation. The hose is subjected only to little wear as a result of this transverse movement and the connections of hose 46 to holder 3 and bushing 1 are substantially free from any transverse load. Oldham coupling 2 is protected against penetration of cooling water and metal chips carried thereby by hose 46 and the water-tight connections between the hose, the holder and the bushing. Therefore, the reamer holding device of the invention is not subject to the effect of the inertia obeserved in coupling of conventional reamer holding devices so that the reamer holding device has a very long-lasting service life.

While the invention has been described in conjunction with a reamer tool, it should be noted that the holding device according to the invention is likewise applicable to other tools, such as—without limitation—threading tools and countersinking tools, for compensating any axial offset between the tool and the workpiece to be machined. The coupling may have any configuration that, similar to the above referred to "Oldham"-coupling, permits a radial displacement of the coupled parts, i.e. the tool receiving bushing 1 and tool holder 3, relative to each other, while establishing a non-rotary connection therebetween.

What is claimed is:

1. A holding device for a reamer tool in a machine too, which comprises
   (a) a tool holder adapted to be secured to the machine tool for rotation about a longitudinal axis,
   (b) a tool receiving means radially displaceably guided in the tool holder,
   (c) a coupling comprising a coupling disc for permitting synchronous rotation and limited relative radial displacement between the tool holder and the tool receiving means, and
   (d) means for delivering a cooling liquid to the reamer tool, the cooling liquid delivering means comprising
      (1) respective central bores in the tool holder and in the tool receiving means,
      (2) a tubular, liquid-impermeable structural part connecting the bores, the tubular structural part having opposite ends respectively connected to the tool holder and to the tool receiving means, the tubular structural part bridging the coupling and being deformable in response to any relative movement between the tool holder and tool receiving means during a reaming operation, and
      (3) liquid-tight sealing means between the walls of the bores and the tubular structural part.

2. The holding device of claim 1, wherein the tubular structural part is a flexible hose capable of withstanding the pressure of the cooling liquid and comprised of a material selected from the group consisting of plastic and metal.

3. The holding device of claim 2, further comprising fittings liquid-tightly connecting the opposite hose ends to the walls of the bores in the tool holder and tool receiving means, respectively.

4. The holding device of claim 3, wherein each fitting comprises a coupling piece defining a central bore and having a threaded connection at one end and a nozzle at an opposite end, and a nut screwed to the coupling piece at the nozzle end, the ends of the hose being clamped liquid-tightly between the nozzle and the nut of each fitting, and the threaded connections of the fittings being respectively connected to the tool holder and to the tool receiving means.

5. The holding device of claim 4, wherein the threaded connection of the coupling piece of one of the fittings is screwed to a connecting piece inserted into the bore of the tool holder, and further comprising at least one 0-ring between the connecting piece and the wall of the tool holder bore providing a light-tight seal.

6. The holding device of claim 4, wherein the coupling piece of one of the fittings has a radial annular shoulder facing the threaded connection, the annular shoulder constituting an abutment and sealing face, and the threaded connection of the one fitting being screwed into the bore of the tool receiving means, and further comprising a sealing ring clamped between the radial annular shoulder and an annular end face of the tool receiving means.

7. The holding device of claim 6, wherein the other fitting further comprises an internally threaded connecting ring screwed to the threaded connection and having a portion projecting beyond the threaded connection, and a clamping screw screwed to projecting portion of the internally threaded connecting ring.

8. The holding device of claim 1, further comprising liquid-tight adhesive connections between the walls of the bores of the tool holder and the tool receiving means and the hose ends.

9. The holding device of claim 1, wherein the coupling disc permitting synchronous rotation and limited relative radial displacalment between the tool holder and the tool receiving means has two radial end faces, a first one of the coupling disc end faces cooperating with the radial end face of the tool holder, a second one of the coupling disc end faces cooperating with the radial end face of the tool receiving means, at least a part of the coupling disc end faces and of the tool holder and tool receiving means end faces being configured as planar gliding surfaces, and pairs of said planar gliding surfaces facing and contacting each other for transmitting axial pushing forces to the reamer tool.

10. The holding device of claim 9, wherein substantially all of the end faces are configured as planar gliding surfaces, said gliding surfaces extending substantially perpendicularly to the rotary axis of the tool receiving means.

11. The holding device of claim 10, wherein the pairs of contacting gliding surfaces are of substantially the same size and configuration.

12. The holding device of claim 9, wherein the tool holder defines a chamber for receiving a lubricating and gliding medium, the chamber being in communication with the gliding surfaces for lubricating the same.

13. The holding device of claim 9, wherein at least one of the gliding surfaces is coated with a plastic material having high gliding ability (low friction).

14. The holding device of claim 9, wherein the coupling disc is made of a synthetic resin having high gliding ability (low friction).

15. The holding device of claim 9, wherein the tool holder is comprised of an element adapted to be inserted in the machine tool, the insert element having the gliding surface of the tool holder and said gliding surface constituting an outer limiting face, and a sleeve encompassing the coupling means and a portion of the tool receiving means, the insert element and the sleeve having adjacent ends dimensioned for connection to each other.

16. The holding device of claim 15, wherein the adjacent ends of the insert element and the sleeve have interengaging, complementary centering parts and walls complementing each other to define a gap for receiving a bonding agent for bonding the insert element to the sleeve.

17. A tool holding device in a machine tool, which comprises:
- (a) a tool holder adapted to be secured to the machine tool for rotation about a longitudinal axis, the holder having a radial end face,
- (b) a tool receiving means radially dispalceably guided in the tool holder, the tool receiving means having a radial end face,
- (c) coupling means providing a non-rotational connection between the tool holder and the tool receiving means, the coupling means comprising
  - (1) a coupling disc having two radial end faces, a first one of the coupling disc end faces cooperating with the radial end face of the tool holder, a second one of the coupling disc end faces cooperating with the radial end face of the tool receiving means, at least a part of the coupling disc end faces and of the tool holder and tool receiving means end faces being configured as planar gliding surfaces, and pairs of said planar gliding surfaces facing and contacting each other for transmitting axial pushing forces to the tool; and
- (d) means for delivering a cooling liquid to the reamer tool, the cooling liquid delivering means comprising
  - (1) respective central bores in the tool holder and in the tool receiving means,
  - (2) a tubular, liquid-impermeable structural part connecting the bores, the tubular structural part having opposite ends respectively connected to the tool holder and to the tool receiving means, the tubular structural part bridging the coupling and being deformable in response to any relative movement between the tool holder and tool receiving means during a reaming operation, and
  - (3) liquid-tight sealing means between the walls of the bores and the tubular structural part.

* * * * *